Aug. 7, 1945.  S. D. RUSSELL  2,381,620
PICK-UP BALER
Filed June 8, 1942  5 Sheets-Sheet 1

Inventor
Stanley D. Russell.
By: Soans, Pond & Anderson, Attys.

Aug. 7, 1945. S. D. RUSSELL 2,381,620
PICK-UP BALER
Filed June 8, 1942 5 Sheets-Sheet 2
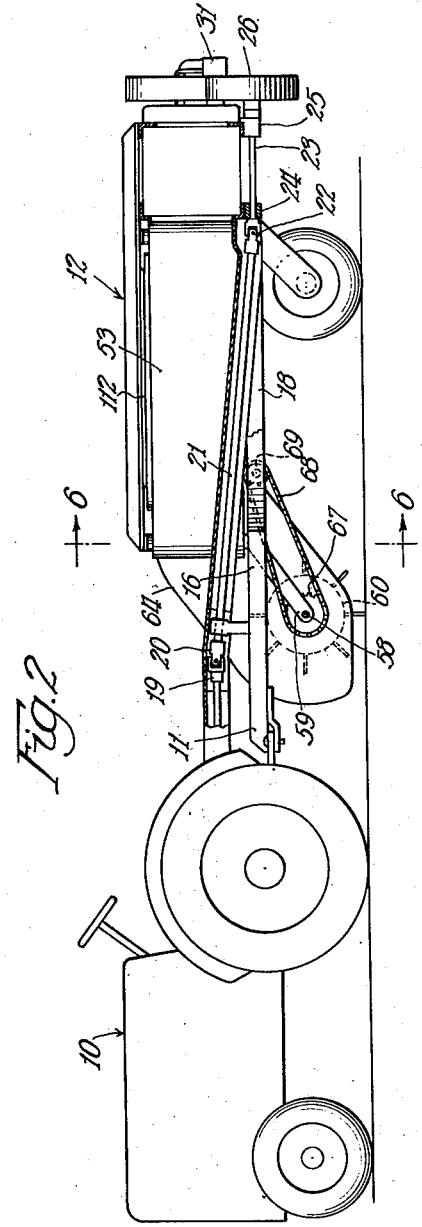
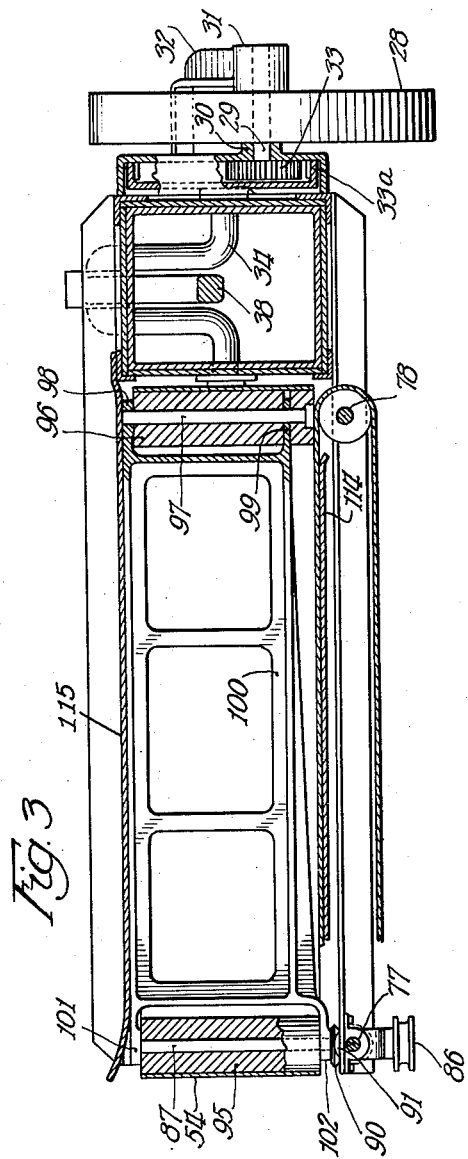
Inventor
Stanley D. Russell
By Soans, Pond & Anderson, Attys.

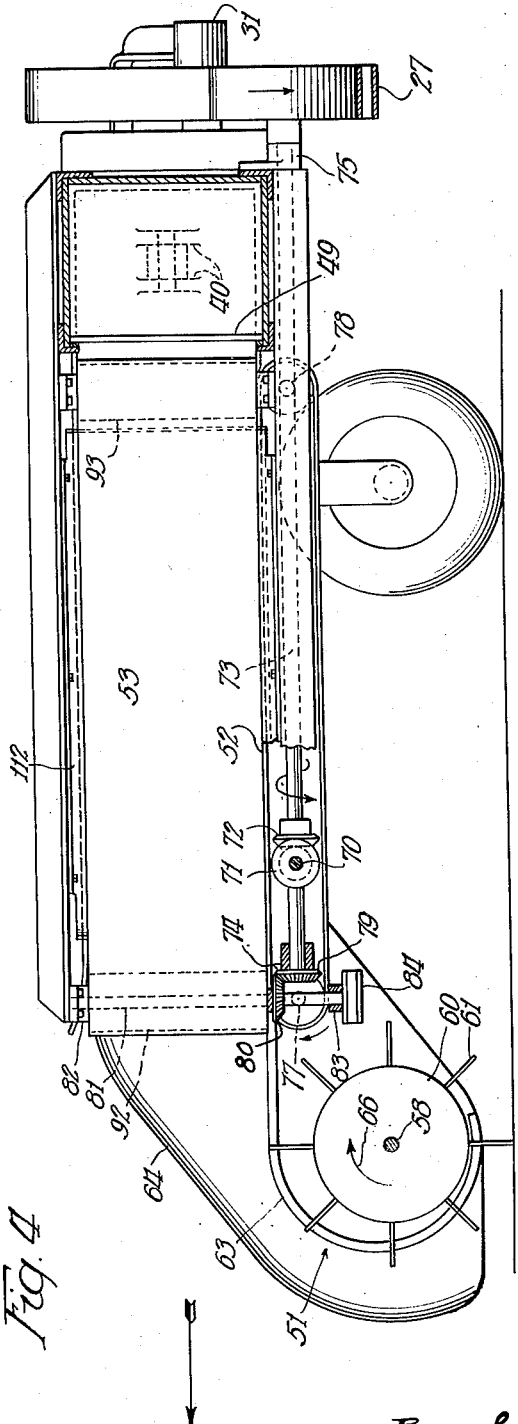

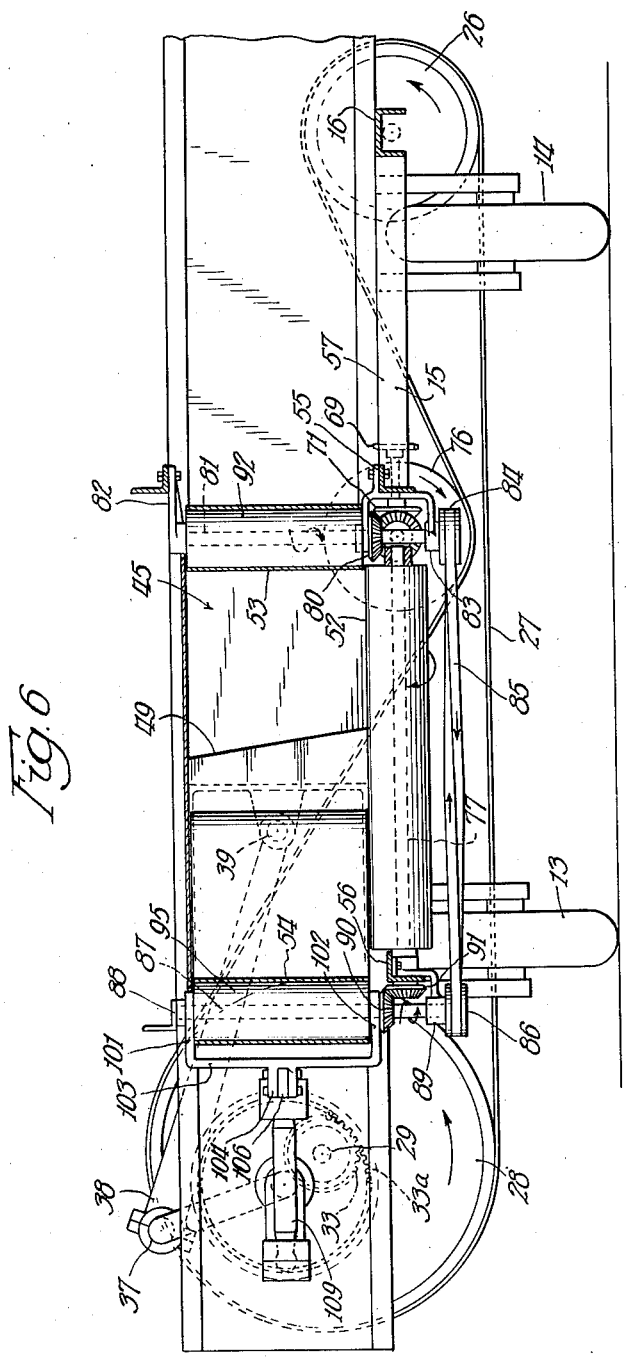

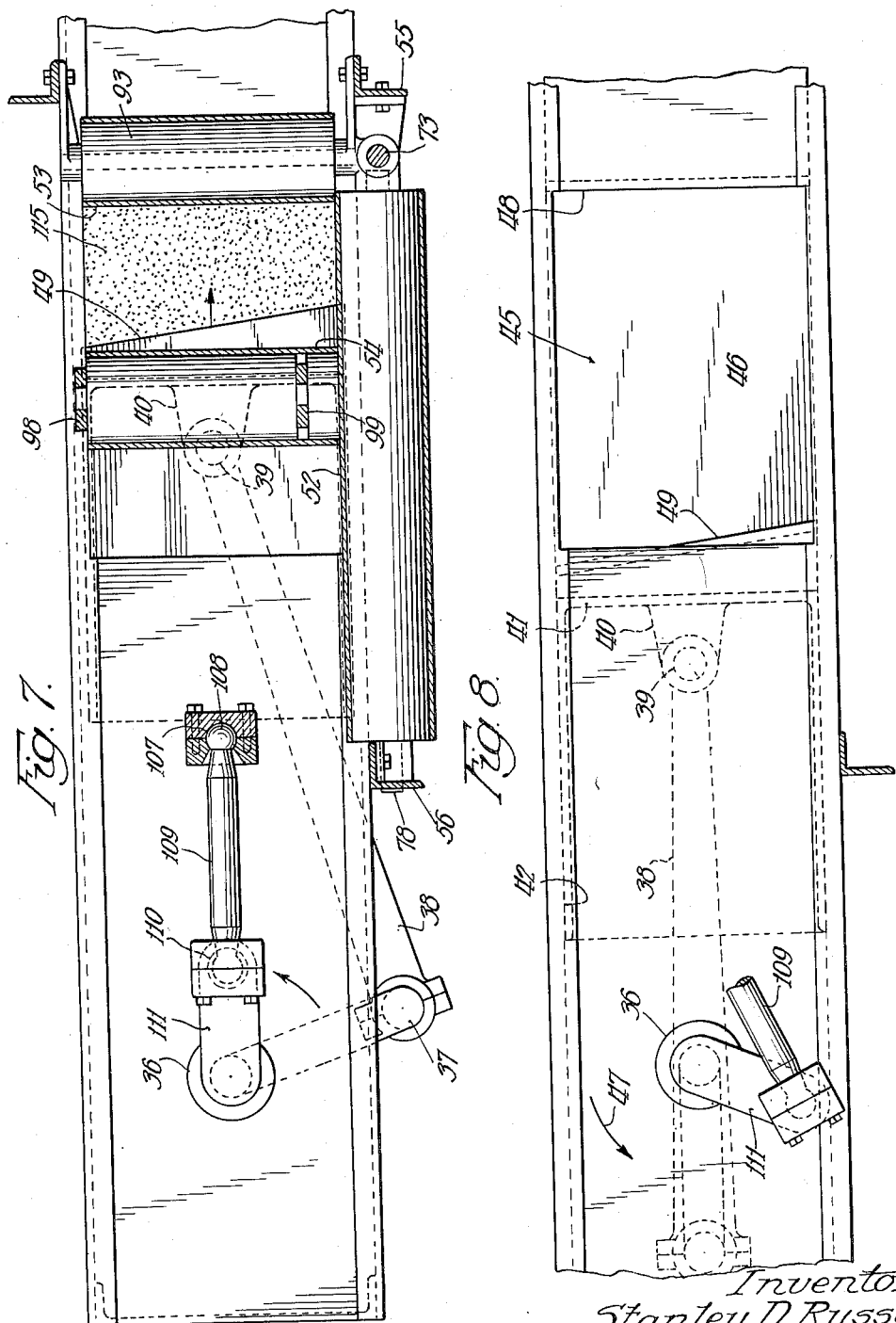

Patented Aug. 7, 1945

2,381,620

UNITED STATES PATENT OFFICE 2,381,620

PICKUP BALER

Stanley D. Russell, Racine, Wis., assignor to J. I. Case Company, a corporation of Wisconsin Application June 8, 1942, Serial No. 446,303

11 Claims. (Cl. 100—25)

The invention relates to improvements in pick-up balers for hay, straw, or other like material. The invention, although having its chief usefulness in connection with traveling balers, i. e. of the type which are drawn through the field, has features which are capable of use in connection with stationary balers, i. e. those to which the material is fed by hand or otherwise.

The principal object of the invention is to provide an improved baler construction by which the hay or other material is produced or delivered in the form of a bale, having fairly distinct layers or sections of the compressed material, so that, after the wires have been loosened or removed, the several layers or sections can be removed one at a time without it being necessary to use a knife or other tool or device for dividing the bale.

An important feature of the present invention resides in the provision of an arrangement by which the compacting or compressing of the material, layer by layer, is facilitated by the compression of a continuous stream of the traveling material adjacent the zone where it enters the baling zone, so that the severing device will function with great efficiency. Another important feature of the invention consists in the arrangement by which the flow of material into the compression chamber or guideway is properly distributed from top to bottom of the bale, so that, when the bale is formed, it will be compressed to substantially the same extent at the top of the bale as it is at the bottom. Other features of novelty will be apparent from the following description.

In the drawings accompanying this application, and which illustrate a preferred embodiment of my invention:

Fig. 2 is a side elevation of the machine shown in Fig. 1, certain parts being shown in section;

Fig. 3 is an enlarged fragmentary vertical section taken on the line 3—3 of Fig. 1;

Fig. 4 is an enlarged section taken on the line 4—4 of Fig. 1;

Fig. 5 is a fragmentary sectional plan view of a portion of the machine shown in Fig. 1;

Fig. 6 is a vertical section taken on the line 6—6 of Fig. 2;

Fig. 7 is a section taken on the line 7—7 of Fig. 1; and

Fig. 8 is a fragmentary view similar to Fig. 7, but showing certain parts in the position which they occupy at a different point in the cycle of movement.

Figure 1:
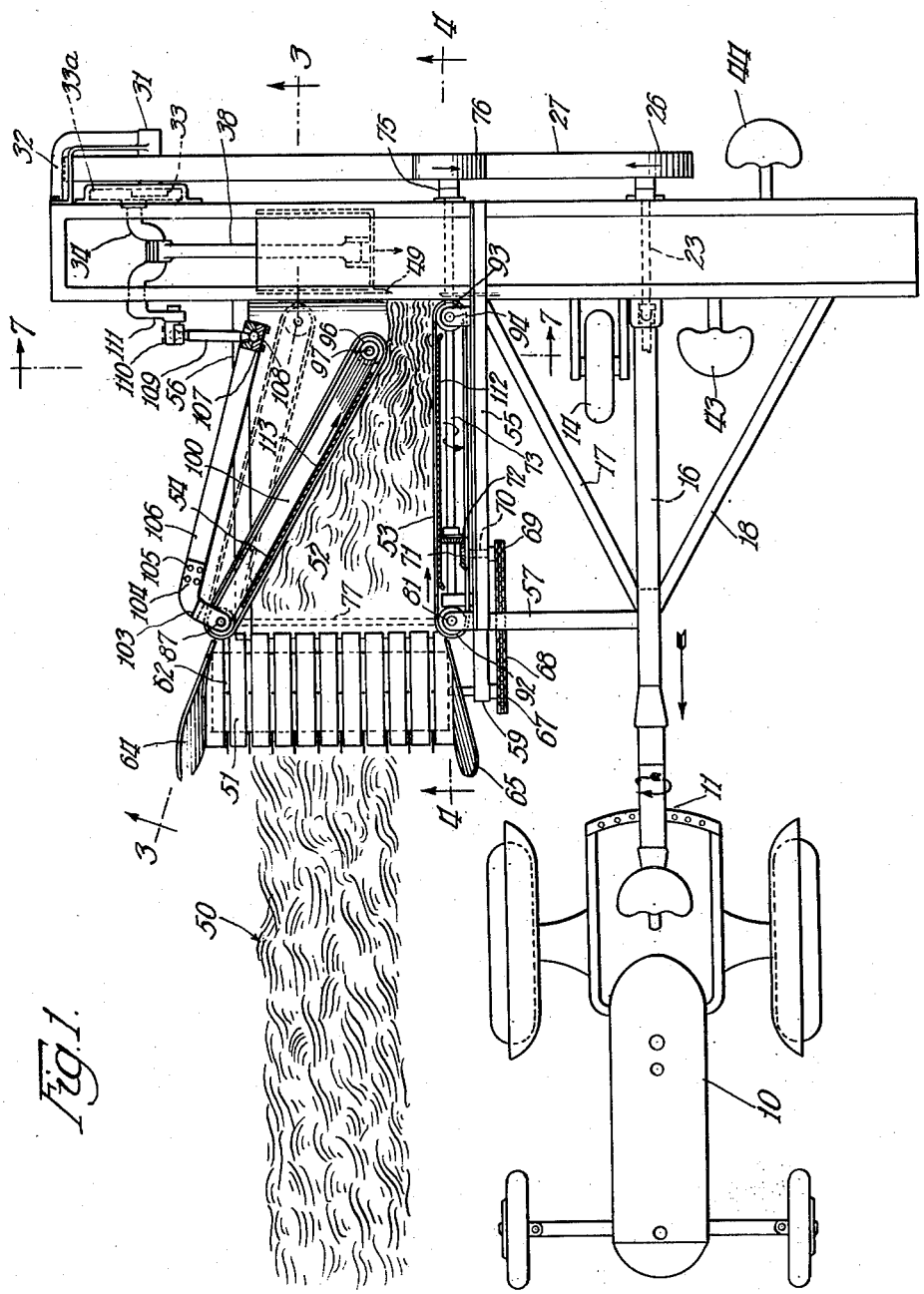
Fig. 1 is a plan view of a tractor drawn pick-up hay baler in which the various features of the invention are embodied.

Referring to the drawings, 10 represents as a whole a tractor which is equipped with the usual draft gear 11 by which the baler is drawn through the field and by which the front end of the baler is supported as it travels over the ground. The baler as a whole may be designated by the numeral 12 and, as shown, it is supported upon a pair of suitable ground wheels 13 and 14. These ground wheels are on opposite sides of the machine, which includes a suitable frame designated as a whole 15 and having a forwardly projecting portion 16, suitably braced by the members 17 and 18 and connected to the draft member or hitch 11.

Although the baler, if desired, may be equipped with its own prime mover, it may be conveniently operated from the motive power of the tractor by means of the power take-off which is indicated at 19 in Fig. 2 and through a universal joint 20 operates a rearwardly extending transmission shaft or tail shaft 21 the rear end of which, through a universal joint, 22, is connected to a longitudinal shaft 23. The shaft 23 is journaled in suitable bearings 24 and 25 and on its rear end is equipped with a belt pulley 26. The belt pulley 26, as shown best in Fig. 6, is connected by means of a belt 27 with a large pulley in the form of a fly wheel 28 at the opposite side of the machine, which pulley 28 is connected to a shaft 29 journaled in a bearing 30 formed as a part of a housing which encloses gearing, presently to be described. The outer end of said shaft 29 is journaled in a bearing 31 formed on the end of a bracket 32 secured to the frame of the machine.

On the shaft 29, there is keyed a pinion 33 which meshes with an internal spur gear 33a keyed to the rear end of the main crank shaft 34. Said crank shaft is supported in suitable bearings 35 and 36 and is made with a ruggedly constructed crank, the pin 37 of which is engaged by the big end of a connecting rod or pitman 38. The other end of said pitman 38 is connected by means of a pivotal joint 39 between a pair of lugs 40 formed on the inside of the front wall or head of a hollow ram 41 which is rectangular in cross section and is arranged to reciprocate in the compression chamber or guide-way 42 within which the material is compressed and baled.

It will be seen that the guide-way designated as a whole 42 extends in a horizontal direction crosswise of the line of draft, and it will be understood that said guide-way at the end remote from the crank shaft 34 is of skeleton formation and extends a sufficient distance crosswise of the machine so that operators located on the seats 43 and 44 can apply and tie the usual baling wires. In view of the fact that the arrangements for effecting a proper division of the bales and a proper compression of the material as it is baled are well-known in the art, it is not necessary to illustrate or describe the same in detail.

The material enters the bale case or guideway 42 through a substantially rectangular opening 45 (see Fig. 8) in the front wall of the guide-way, it being understood that said front opening 45 is the only opening in the guide-way 42 within the general zone of operation of the reciprocating ram 41. The material which enters said opening 45 is propelled by suitable arrangements later described.

It will be understood, of course, that the rearward movement of the material transversely of the guide-way 42 is arrested when said material engages the rear wall 46 of the guide-way or ram chamber, which will occur when the crank 37 is in its "out" position indicated in Fig. 8, so as to expose the inlet opening 45. When the crank moves in the direction of the arrow 47 (see Fig. 8) to the position shown in Fig. 7, the body of the ram 41 closes said opening 45 and pushes before it the material which has entered the guide-way. Said material is severed from the flowing stream of material by means of a severing device, which includes a stationary shear member 48 extending vertically and constituting one side of said opening 45, the other shear member being a knife 49 attached to, or forming a part of, the head of the ram 41.

Describing the means for feeding the material from the window 50 up into the compression chamber where it is baled, it will be seen that there is a pick-up device designated as a whole 51 which feeds the material on to a traveling belt 52. While the material is being fed forward by the generally horizontally extending belt 52, it is also being operated upon by a pair of oppositely disposed, vertically extending belts designated as a whole 53 and 54, which not only serve to feed the material forwardly but also to compress the same prior to delivery into the baling zone. Said pick-up 51 and belts 52, 53 and 54 may now be described in detail.

Forwardly extending from the main frame of the baler, there are pair of girders 55 and 56. The front end of 55 is connected to a transverse frame member 57 which is also rigidly secured to the main frame element 16 of the baler. The frame members just described support the pick-up and belt arrangements and their operating parts.

The pick-up 51 is of the usual construction having a main shaft 58 supported in suitable bearings on the frame, one of said bearings being indicated at 59 in Fig. 1. As shown best in Fig. 4 and Fig. 1, the pick-up in its main elements comprises a drum 60 carried by the shaft 58 and on said drum 60 there are distributed a plurality of sets of pick-up fingers 61, there being about ten rows of such fingers and about eight fingers to each row, spaced equally around the circumference of the drum, as shown best in Fig. 4. The ends of said fingers extend through slots 62 in a housing designated as a whole 63, said housing extending between the side wings 64 and 65 of the pick-up. It will be understood that, when the shaft 58 is rotated in the proper direction, i. e. in the direction of the arrow 66, the fingers will engage the material in the windrows and move same upwardly and rearwardly, so that the material will be delivered to the forward end of the belt 52.

In order to drive the pick-up shaft 58 and belts, the end of said shaft 58 is equipped with a suitable sprocket 67, which, by means of a chain 68, is connected to a sprocket 69 on a jack shaft 70. Said jack shaft is journaled in suitable bearings in the frame of the machine and on its opposite end is equipped with a bevel gear 71 which is driven by a bevel gear 72 on a horizontally or longitudinally extending shaft 73. The front end of said shaft 73 is journaled in a suitable frame bearing 74, and the rear end of said shaft 73 is journaled in a bearing 75. The rear end of said shaft extends beyond the bearing and is equipped with a belt pulley 76 which rests upon and is driven by the top stretch of the main belt 27, previously described.

The horizontal longitudinal belt conveyor or apron 52 is trained around a pair of rollers mounted on parallel transverse shafts 77 and 78, said shafts being mounted in suitable bearings in the frame of the machine. Only the front shaft 77 of said pair of shafts is positively driven. This is accomplished by the following mechanism.

On the end of the longitudinal shaft 73, there is keyed a bevel pinion 79 which meshes with a corresponding bevel pinion 80 keyed to the vertical shaft 81, rotatably supported in an upper bearing 82 and a lower bearing 83. On the lower extremity of said shaft 81, there is keyed a belt pulley 84 which, by means of a crossed belt 85 (see Fig. 6) drives a belt pulley 86 keyed to the lower end of a vertical shaft 87. Said vertical shaft 87 is rotatably supported in bearings 88 and 89. Above the bearing 89, the shaft 87 carries a bevel pinion 90 which meshes with a bevel pinion 91 keyed on the end of said shaft 77. The sets of bevel gears just described are so positioned on their respective shafts that the shaft 77 will be driven in the proper direction to drive the apron or belt conveyor 52 rearwardly when the tractor is operating.

To the shaft 81 previously described, there is secured a drum or roller 92 around which is trained a belt conveyor 53 previously referred to. The rear portion of said vertical belt or apron 53 is supported on a roller 93 mounted on a vertical shaft 94 journaled to rotate freely in suitable bearings carried by the upper and lower members of the frame.

On the vertical shaft 87 previously described, there is fixed a roller or drum 95 around which is trained the vertical belt or apron 54. The other or rear end of said belt 54 is trained around a roller 96 fixed on a vertical shaft 97 rotatably mounted in upper and lower bearings 98 and 99 (see Fig. 3) formed as integral parts of a swinging skeleton frame 100. The front end of said skeleton frame 100 is also equipped with bearing members 101 and 102 which rotatably receive the shaft 87 previously referred to.

The bearing parts 101 and 102 of the frame 100 are extended at an angle beyond the drum or roller 95 and are connected together by a yoke member 103 (see Fig. 6). In the middle of said yoke 103, there is integrally formed an L-shaped bifurcation 104 between the ears of which there is secured by means of rivets or bolts 105 the front end of an arm 106. At the rear end of said arm (see Fig. 1), there is formed a socket 107 for receiving the ball 108 of a ball and socket joint arrangement which connects the rear end of arm 106 with a pitman or connecting rod 109. The outer end of the pitman 109 is also fitted with a ball and socket connection between said pitman 109 and a crank pin 110 on a crank 111 carried by the front end of the main crank shaft 34.

In order to prevent sagging of the various belt conveyors due to pressure of the material at points between the supporting rollers of the various belt conveyors, it may be found advisable to support the active stretches of the various belt conveyors or aprons by means of platform supports. For example, as shown in Fig. 1, the belt conveyor 53 is equipped with a support 112, the swinging belt conveyor 54 is equipped with a suitable support 113, and the horizontal apron 52 is equipped with a support 114 (see Fig. 3). A cover plate 115, placed horizontally above the belts 53 and 54, confines the material within the conveyor as the material is moved toward the feeding opening 45 leading to the compression chamber 42.

The arrangement functions in the following manner. When the tractor is operating and is drawing the device through the field, the power take-off shaft of the tractor, through tail shaft 21, drives belt pulley 26, which in turn drives belt pulley 76 and fly-wheel 28. The fly-wheel 28, through the gearing 33—33a, drives crank shaft 34, which, through crank 37 and pitman 38, serves to reciprocate the ram 41 within the compression chamber or guide-way of the baler. Any material which has entered through opening 45 in the front wall of the guide-way is, of course, severed by the knives 49 and 48 and thus is compressed, a batch at a time.

The pulley 76, through shaft 73 and bevel gears 70 and 72 and chain sprocket 68, drives shaft 58 of the pick-up which tosses the material on to the front stretch of the belt conveyor or traveling apron 52. Said traveling apron 52 is driven by a mechanism previously described. It will be understood also that, by means of mechanism previously described, the vertical belt conveyors 53 and 54 will also be driven in such direction as to convey the material rearwardly. The belt conveyor 54, however, is not stationary as is the belt conveyor 53, but oscillates or reciprocates in unison with the main crank shaft 34. This reciprocatory or oscillatory movement of the belt conveyor 54 is effected by means of the crank 111 which, through pitman 109, reciprocates or oscillates the rear end of the arm 106 which is rigidly connected to the bifurcated bell-crank 104 and through it to the skeleton frame 100 (see Fig. 3), the rear end of which carries the drum 96 around which the belt conveyor 54 is trained.

Hence, as the crank 111 on the main crank shaft 34 rotates, the rear end of the belt conveyor 54 will be oscillated or reciprocated towards and away from the relatively stationary belt conveyor 53 and thus serves alternately to compress and release the hay or other material which is being carried rearwardly by the horizontal apron 52.

By an examination of Fig. 7 and Fig. 8, it will be seen that the relative positions of the main crank pin 37 and the crank pin 110 are such that the material 115 (see Fig. 7) located in the opening has been compressed by the apron 54 to a point where it is ready to receive and be operated upon by the cutting edge 49 of the ram which, at that instant, has just begun to advance into its cutting zone. Thus the material will be firmly held or compressed into proper condition to effect an efficient severing operation.

It will be understood also that, on account of the fact that both of the aprons 53 and 54 are driven and extend vertically for a distance equal to the height of the bale, the material will be well distributed from top to bottom of the feed opening, and there will be virtually no tendency for the material to become more solidly concentrated at the bottom than at the top of the bale. This feature is of considerable advantage, in view of the fact that it is important to have the bales compressed sufficiently throughout the cross section of the bale while, at the same time, it is not desirable to have too great a compression at any particular point in the bale, otherwise the circulation of air will be impeded, and the hay will not maintain its quality.

The scope of the invention should be determined by reference to the appended claims.

I claim:

1. In a device for baling hay or like material in the field, the combination of a frame having a horizontal guide-way provided with an opening for receiving material to be baled, a plunger arranged to reciprocate in one end of and longitudinally of said guide-way for compressing the material fed into said guide-way, means for directing the material into the guide-way into the path of said plunger, means for preliminarily compacting the material in a direction parallel to the plunger axis prior to the entrance of the material into the guide-way, said last means including a vertically extending baffle extending towards said opening and inclined in the direction to compress the material as the latter approaches the guide-way, means for severing the material fed into the guide-way from that which has not yet entered said guide-way, and means for reciprocating said baffle synchronized with the movement of said plunger.

2. In a device for baling hay or like material in the field, the combination of a vehicle embodying a frame having a horizontal guide-way for receiving material to be baled, said guide-way extending crosswise of the line of draft and being rectangular in cross section with a vertical front portion having an inlet opening therein, a plunger arranged to reciprocate in one end of and longitudinally of said guide-way across said opening for compressing the material fed into said guide-way, means for preliminarily compacting the material in a direction parallel to the plunger axis prior to entrance of the material through said opening into said guide-way, said last named means including a vertically extending baffle adjacent said opening for compressing the material as it is directed towards said opening, and means for reciprocating said baffle synchronized with the movement of said plunger.

3. In a machine for baling hay or like material, the combination of a frame provided with a horizontal guide-way for receiving the material to be baled and being rectangular in cross section with a vertical front portion having an inlet opening therein, a plunger arranged to reciprocate in one end of and longitudinally of said guide-way across said opening, complementary shearing knives provided respectively on one side of said opening and on the plunger, and means for directing material into the guide-way through said opening, said last named means including a belt arranged in a vertical plane inclined towards said opening so as to compress the material fed through said opening, axially vertical rollers around which said belt is trained, and means synchronized with the plunger for reciprocating the roller adjacent said opening cross-wise of its axis.

4. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally disposed conveyor for propelling material into said chamber and into the path of said plunger, means for picking the material from the ground as the vehicle moves through the field, said pick-up means being arranged to deliver the material to said horizontally disposed conveyor, a pair of baffles extending upwardly from said conveyor and extending from adjacent the receiving end of said conveyor toward said baling chamber, at least one of said baffles being mounted for horizontal rocking movement about an axis adjacent the receiving end thereof so as to cause the delivery end thereof to be movable toward the delivery end of the other of said baffles for effecting preliminary compaction of the material as an incident to the delivery thereof to said chamber, and means for effecting said horizontally rocking baffle movement.

5. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally disposed conveyor for propelling material into said chamber and into the path of said plunger, means for picking the material from the ground as the vehicle moves through the field, said pick-up means being arranged to deliver the material to said horizontally disposed conveyor, a pair of baffles extending upwardly from said conveyor and extending from adjacent the receiving end of said conveyor toward said baling chamber, at least one of said baffles being mounted for horizontal rocking movement about an axis adjacent the receiving end thereof so as to cause the delivery end thereof to be movable toward the delivery end of the other of said baffles for effecting preliminary compaction of the material as an incident to the delivery thereof to said chamber, means for effecting said horizontally rocking baffle movement, said horizontally rockable baffle embodying material propelling means for assisting said conveyor to deliver the material to said chamber, and means for actuating said material propelling means during the movement of said baffle.

6. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally disposed conveyor for propelling material into said chamber and into the path of said plunger, means for picking the material from the ground as the vehicle moves through the field, said pick-up means being arranged to deliver the material to said horizontally disposed conveyor, a pair of baffles extending upwardly from said conveyor and extending from adjacent the receiving end of said conveyor toward said baling chamber, at least one of said baffles being mounted for horizontal rocking movement about an axis adjacent the receiving end thereof so as to cause the delivery end thereof to be movable toward the delivery end of the other of said baffles for effecting preliminary compaction of the material as an incident to the delivery thereof to said chamber, means for effecting said horizontally rocking baffle movement, said horizontally rockable baffle embodying material propelling means for assisting said conveyor to deliver the material to said chamber, means for actuating said material propelling means during the movement of said baffle, and a cover plate overlying the space between said baffles for cooperating with said conveyor to confine the material between said baffles.

7. In a device for baling hay or like material in the field, the combination of a vehicle embodying a baling chamber having its longitudinal axis transverse to the direction of travel of the baler, a plunger adapted to be reciprocated longitudinally in said baling chamber for compressing material fed thereinto, a draw bar extending forwardly from the vehicle for connection to a tractor, a power take-off shaft adapted to be driven by the tractor and extending in the general direction of said draw bar and to the rear of said baling chamber, a pulley on said shaft rearwardly of said chamber at one end thereof, a fly wheel rotatably mounted on the vehicle rearwardly of said chamber at the opposite end thereof and operatively connected to said plunger for effecting reciprocation of the latter as an incident to rotation of the fly wheel, and a belt connection between said pulley and fly wheel for driving the latter.

8. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally-disposed conveyor for propelling material into said chamber and into the path of said plunger, means for picking the material from the ground as the vehicle moves through the field, said pick-up means being arranged to deliver the material to said horizontally-disposed conveyor, and movable means forming a part of said conveyor and actuated synchronously with the movement of said plunger transversely of the line of movement of the conveyed material for intermittently compacting the material in a direction parallel to the plunger axis prior to the delivery of the material into said chamber.

9. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally disposed conveyor for propelling material into said chamber and into the path of said plunger, said conveyor including side walls relatively movable toward and away from each other for compacting the material in a direction parallel to the plunger axis prior to the delivery of the material into said chamber, means connected to reciprocate with said plunger for causing the intermittent relative movement of said conveyor side walls, and other means for picking the material from the ground as the vehicle moves through the field, said pick-up means being arranged to deliver the material to said horizontally disposed conveyor.

10. In a device for baling hay or like material in the field, the combination of a vehicle embodying a frame having a horizontal baling chamber for receiving material to be baled, a plunger arranged to reciprocate in and longitudinally of said chamber for compressing the material fed thereinto, a substantially horizontally disposed conveyor for propelling material into said chamber and into the path of said plunger, means for picking the material from the ground as the vehicle moves through the field, said pick-up means being arranged to deliver the material to said horizontally disposed conveyor, and movable means forming a part of said conveyor and actuatable transversely to and independently of the material-advancing-movement of said conveyor for compacting the material in a direction parallel to the plunger axis prior to the delivery of the material into said chamber.

11. In a device for baling hay or like material in the field, the combination of a vehicle embodying a frame having a horizontal guide-way for receiving material to be baled, said guide-way extending cross-wise of the line of draft and being rectangular in cross section with a vertical front portion having an inlet opening therein, a plunger arranged to reciprocate in one end and longitudinally of said guide-way across said opening for compressing the material fed into said guide-way, means adjacent said opening for preliminarily compacting the material in a direction parallel to the plunger axis and conveying said material transversely of said guide-way to and through said opening into said guide-way, said means including a vertically extending movable baffle for effecting the compacting of said material independently of the material-advancing-movement of said means, and means for actuating said baffle.

STANLEY D. RUSSELL.